US012734962B2

(12) United States Patent
Kawahara

(10) Patent No.: US 12,734,962 B2
(45) Date of Patent: Sep. 15, 2026

(54) VEHICLE

(71) Applicant: TOYOTA JIDOSHA KABUSHIKI KAISHA, Toyota (JP)

(72) Inventor: Satoshi Kawahara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 18/976,701

(22) Filed: Dec. 11, 2024

(65) Prior Publication Data

US 2025/0196769 A1 Jun. 19, 2025

(30) Foreign Application Priority Data

Dec. 18, 2023 (JP) ................................ 2023-213076

(51) Int. Cl.
*B60Q 9/00* (2006.01)

(52) U.S. Cl.
CPC ..................................... *B60Q 9/00* (2013.01)

(58) Field of Classification Search
CPC ........................................................ B60Q 9/00
USPC .......................................................... 340/438
See application file for complete search history.

(56) References Cited

U.S. PATENT DOCUMENTS 9,754,430 B1 * 9/2017 Wolf .................... G07C 5/0833
2017/0107747 A1 * 4/2017 Dente ..................... E05B 81/86
2018/0162413 A1 * 6/2018 Theodosiou ........... B60K 28/12

FOREIGN PATENT DOCUMENTS

JP 2022-161097 A 10/2022

* cited by examiner

*Primary Examiner* — Kam Wan Ma
(74) *Attorney, Agent, or Firm* — Oliff PLC

(57) ABSTRACT

A vehicle includes a control unit configured to provide a safe exit assist feature that supports an occupant in exiting the vehicle, and a notification unit. The notification unit is configured to acquire first information indicating whether the control unit has stopped providing the safe exit assist feature, and second information indicating whether power necessary for providing the safe exit assist feature has been supplied to the control unit. The notification unit is configured to, when the first information indicates that the control unit has not stopped providing the safe exit assist feature and the second information indicates that the power necessary for providing the safe exit assist feature has not been supplied to the control unit, notify the occupant of information indicating that the safe exit assist feature has not been provided.

5 Claims, 3 Drawing Sheets

Display
Speaker
Surrounding Sensor
Door Sensor
Opening Restriction Device
Interface ECU
Safe Exit Assist ECU
Power Source Management ECU
Shared Memory
Battery
Power Source Switch
10
11
12
13
14
15
16
17
18
19
20
21
22
23
24
25
26

VEHICLE

CROSS-REFERENCE TO RELATED APPLICATIONS

This application is based upon and claims the benefit of priority from Japanese Patent Application No. 2023-213076, filed on Dec. 18, 2023, the entire contents of which are incorporated herein by reference.

BACKGROUND

1. Field

The present disclosure relates to a vehicle having a safe exit assist feature.

2. Description of Related Art

Japanese Laid-Open Patent Publication No. 2022-161097 discloses a known vehicle having a safe exit assist feature. The safe exit assist feature issues warnings or restricts door-opening operations when a door is being opened to prevent contact between the opened door and an obstacle, such as another vehicle or a pedestrian that has approached the vehicle.

Due to failures or the like, the supply of power to a control unit that provides the safe exit assist feature may be unexpectedly interrupted. In such cases, the occupant may not be aware that the provision of the safe exit assist feature has been stopped. As a result, the occupant may open the door without receiving a warning or restriction on the door-opening operation, even if there is a possibility of contact between the opened door and an obstacle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A vehicle according to an aspect of the present disclosure includes a control unit configured to provide a safe exit assist feature that supports an occupant in exiting the vehicle, and a notification unit. The notification unit is configured to acquire first information indicating whether the control unit has stopped providing the safe exit assist feature, and second information indicating whether power necessary for providing the safe exit assist feature has been supplied to the control unit, and, when the first information indicates that the control unit has not stopped providing the safe exit assist feature and the second information indicates that the power necessary for providing the safe exit assist feature has not been supplied to the control unit, notify the occupant of information indicating that the safe exit assist feature has not been provided.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Figure 1:
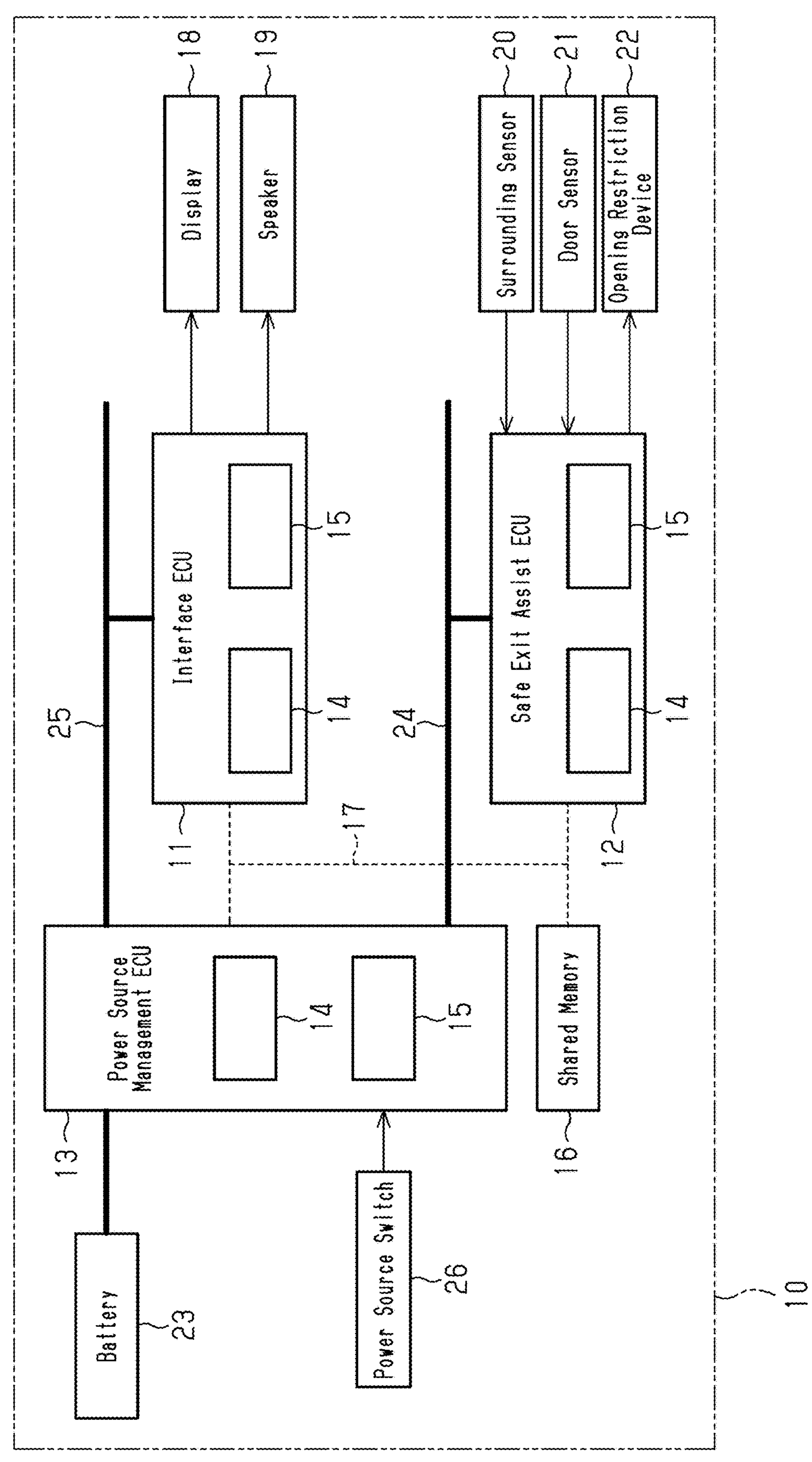
FIG. 1 is a diagram schematically showing the configuration of a vehicle according to an embodiment.
Figure 2:
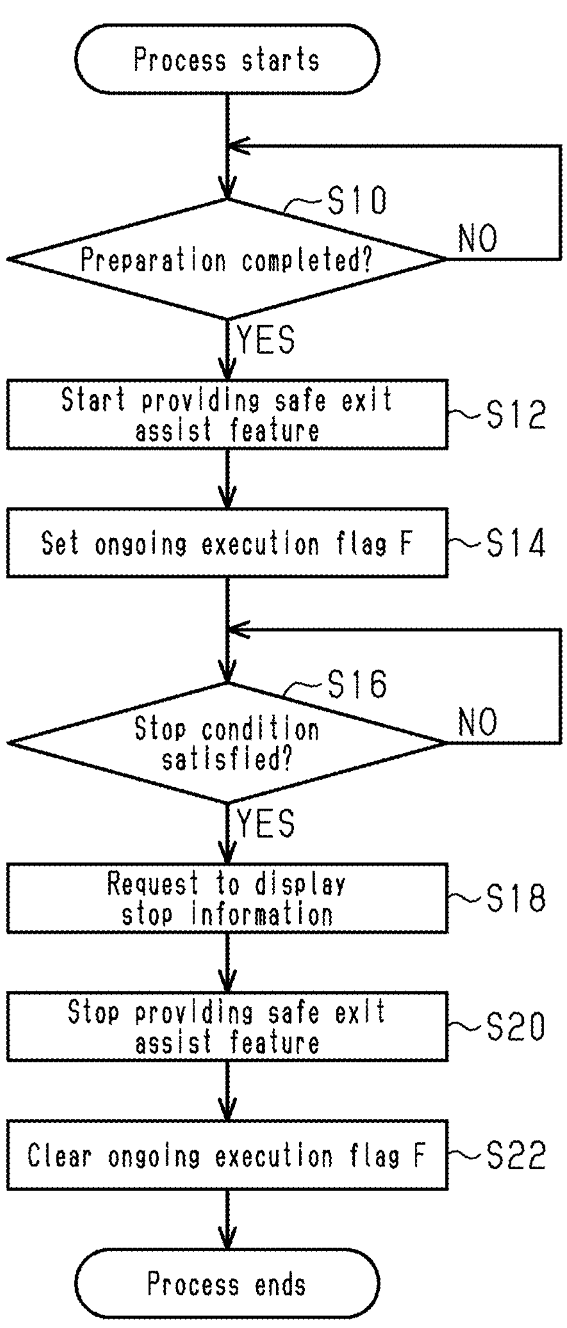
FIG. 2 is a flowchart illustrating a notification routine executed by the safe exit assist ECU shown in FIG. 1.

Hereinafter, an embodiment of the vehicle 10 will be described in detail with reference to FIGS. 1 to 3.

Configuration of Vehicle

A configuration of a vehicle 10 according to the present embodiment will now be described with reference to FIG. 1. The vehicle 10 includes various electronic control units (ECUs). The ECUs mounted in the vehicle 10 include an interface ECU 11, a safe exit assist ECU 12, and a power source management ECU 13. Each ECU includes a processing device 14 and a storage device 15. Each ECU provides various features by the processing device 14 executing a program stored in the storage device 15. The vehicle 10 includes a shared memory 16, which is a storage medium that can be referred to by each ECU. The shared memory 16 is installed in, for example, one of the ECUs mounted in the vehicle 10. The ECUs and the shared memory 16 are connected to each other in a communicable manner via an in-vehicle network 17. The processing device 14 is processing circuitry that includes one or more processors. The storage device 15 and the shared memory 16 include memories such as a RAM and a ROM.

The interface ECU 11 provides an interface feature between the occupant and the vehicle 10. A display 18 and a speaker 19 installed in the vehicle 10 are connected to the interface ECU 11. The interface ECU 11 notifies the occupant in the vehicle 10 of various types of information through image outputs from the display 18 and sound outputs from the speaker 19.

The safe exit assist ECU 12 provides a safe exit assist feature. The safe exit assist ECU 12 is connected to a surrounding sensor 20 that detects an object around the vehicle 10, a door sensor 21 that detects a door opening operation by the occupant, and an opening limiting device 22 that restricts the door opening operation. The surrounding sensor 20 includes, for example, a sonar and a LiDAR. The safe exit assist ECU 12 determines whether there is an object that may come into contact with the door when the door opening operation is performed, based on the detection results from the surrounding sensor 20 and the door sensor 21. When there is an object that may come into contact with the door, the safe exit assist ECU 12 warns the occupant or restricts the door opening. The details of the process related to the safe exit assist are described in, for example, Japanese Laid-Open Patent Publication No. 2022-161097 and Japanese Laid-Open Patent Publication No. 2020-078959.

The power source management ECU 13 provides a power source management feature for each ECU. The power source management ECU 13 switches each ECU between a power-on state and a power-off state in accordance with, for example, an operation state of a power source switch 26 in the vehicle 10. The safe exit assist ECU 12 is connected to the battery 23 via a first power source line 24. The power source management ECU 13 switches the safe exit assist ECU 12 between the power-on state and the power-off state by switching on and off the supply of power through the first power source line 24. The interface ECU 11 is connected to the battery 23 via a second power source line 25, which is different from the first power source line 24. Thus, even when the safe exit assist ECU 12 is in the power-off state, the power source management ECU 13 can set the interface ECU 11 to the power-on state. The interface ECU 11 detects a voltage E1 of the first power source line 24 and a voltage E2 of the second power source line 25.

Processing that Issues Notification that Provision of Safe Exit Assist Feature is to be Stopped When the safe exit assist ECU 12 stops the provision of the safe exit assist feature, the vehicle 10 notifies the occupant of that the provision of the feature is to be stopped. The process executed by the interface ECU 11 and the safe exit assist ECU 12 related to the issuing of notification that the provision of the safe exit assist feature is to be stopped, will now be described in detail.

The process executed by the safe exit assist ECU 12 related to the above-described notification will now be described with reference to FIG. 2. The safe exit assist ECU 12 starts the process of FIG. 2 when the power source is turned on. The letter "S" preceding the numbers in FIGS. 2 and 3, which will be described later, represents the processing steps.

When the safe exit assist ECU 12 is switched to the power-on state and then the preparation for providing the safe exit assist feature is completed (S10: YES), the safe exit assist ECU 12 starts providing the safe exit assist feature (S12). The preparation for providing the safe exit assist feature includes, for example, operational check of the surrounding sensor 20, the door sensor 21, the opening limiting device 22, and the safe exit assist ECU 12. The safe exit assist ECU 12 sets an ongoing execution flag F in response to the start of the provision of the safe exit assist feature (S14). The ongoing execution flag F indicates whether the safe exit assist ECU 12 provides the safe exit assist feature. Specifically, the state where the ongoing execution flag F is set indicates that the safe exit assist feature is being provided. The state where the ongoing execution flag F is cleared indicates that the provision of the safe exit assist feature has been stopped. The ongoing execution flag F is stored in the shared memory 16. Thus, the state of the ongoing execution flag F can be checked by an ECU other than the safe exit assist ECU 12.

Then, when the condition for stopping the provision of the safe exit assist feature is satisfied (S16: YES), the safe exit assist ECU 12 advances the process to step S18. The provision of the safe exit assist feature is stopped on the condition that, for example, a predetermined time has elapses since the power source switch 26 of the vehicle 10 was turned off, it is confirmed that all the occupants have exited the vehicle 10, or that the door of the vehicle 10 is locked.

In step S18, the safe exit assist ECU 12 requests the interface ECU 11 to display information indicating that provision of the safe exit assist feature is to be stopped. In response to the request, the interface ECU 11 causes the display 18 to display information indicating that the provision of the safe exit assist feature is to be stopped. Next, after the safe exit assist ECU 12 stops providing the safe exit assist feature (S20) and clears the ongoing execution flag F (S22), the safe exit assist ECU 12 ends the process of FIG. 2.

The process executed by the interface ECU 11 related to the above-described notification will now be described with reference to FIG. 3. The interface ECU 11 repeatedly executes the process of FIG. 3 at each predetermined control cycle while the interface ECU 11 is operating.

Figure 3:
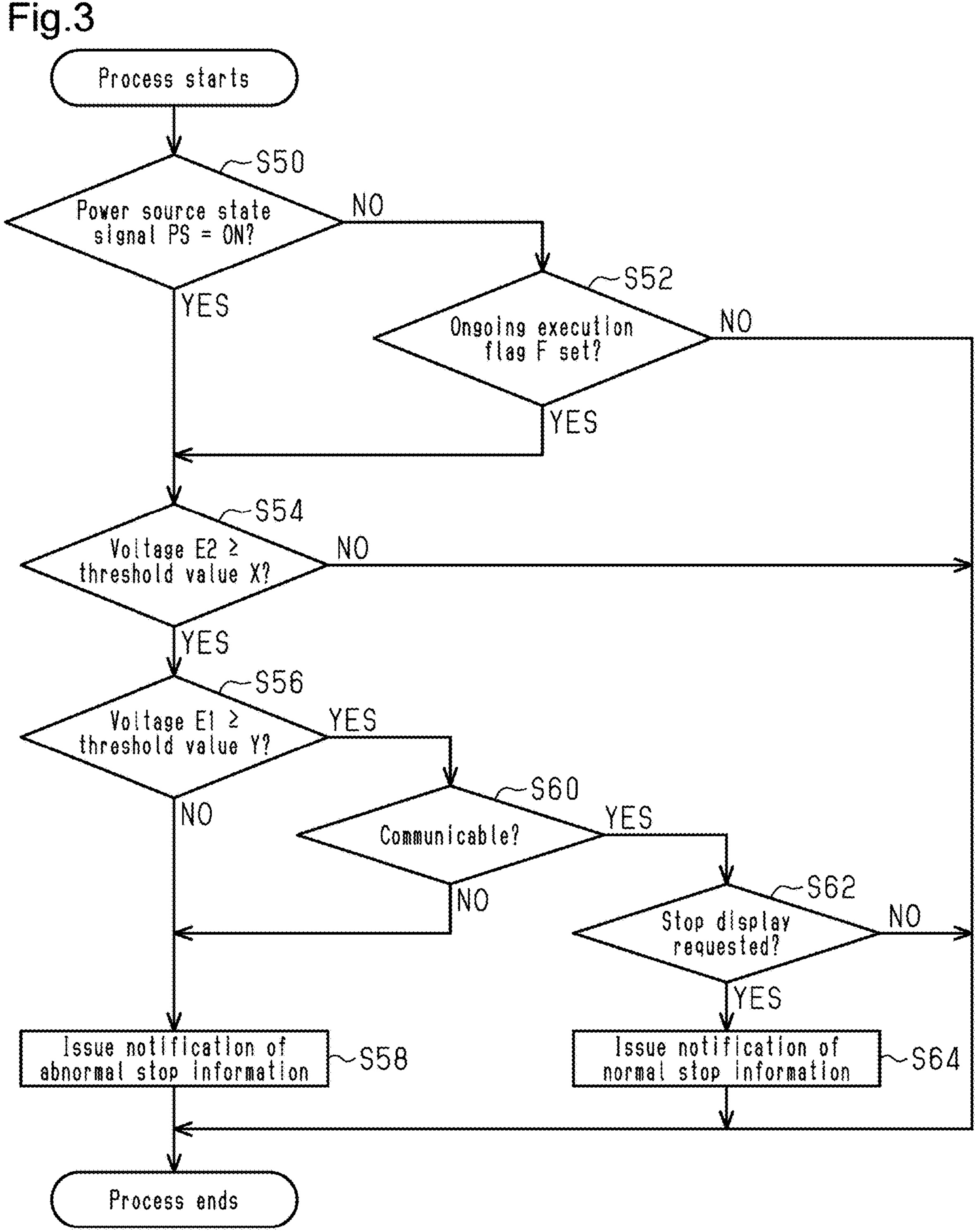
FIG. 3 is a flowchart illustrating a notification routine executed by the interface ECU shown in FIG. 1.

In the process of FIG. 3, the interface ECU 11 first determines whether a power source state signal PS of the safe exit assist ECU 12 is on (S50). The power source state signal PS indicates whether the power source management ECU 13 has supplied power to the safe exit assist ECU 12 through the first power source line 24. When the power source state signal PS is on, it indicates that the power source management ECU 13 has supplied power to the safe exit assist ECU 12. When the power source state signal PS is off, it indicates that the power source management ECU 13 has stopped supplying power to the safe exit assist ECU 12. The power source management ECU 13 periodically outputs the power source state signal PS to other ECUs.

When the power source state signal PS is on (S50: YES), the interface ECU 11 advances the process to step S54. When the power source state signal PS is off (S50: NO), the interface ECU 11 determines whether the ongoing execution flag F stored in the shared memory 16 has been set (S52). When the ongoing execution flag F has been set (S52: YES), the interface ECU 11 advances the process to step S54. When the ongoing execution flag F has been cleared (S52: NO), the interface ECU 11 ends the process of FIG. 3 in the current control cycle.

The process executed by the interface ECU 11 when the process is advanced to step S54 will now be described. In this case, the interface ECU 11 first determines whether the voltage E2 of the second power source line 25 is greater than or equal to a predetermined threshold value X (S54). The threshold value X is set to a lower limit value of the voltage E2 of the second power source line 25, at which the power required for the display 18 to display a screen or for the speaker 19 to output a sound can be supplied to the interface ECU 11. When the voltage E2 is greater than or equal to the threshold value X (S54: YES), the interface ECU 11 advances the process to step S56. When the voltage E2 is less than the threshold value X (S54: NO), the interface ECU 11 ends the process of FIG. 3 in the current control cycle.

In step S56, the interface ECU 11 determines whether the voltage E1 of the first power source line 24 is greater than or equal to a predetermined threshold value Y. The threshold value Y is set to a lower limit value of the voltage E1 of the first power source line 24, at which the power required for providing the safe exit assist feature can be supplied to the safe exit assist ECU 12. When the voltage E1 is less than the threshold value Y (S56: NO), the interface ECU 11 notifies the occupant of the information indicating that the provision of the safe exit assist feature has been abnormally stopped (S58), and then ends the process of FIG. 3 in the current control cycle. The interface ECU 11 issues the information notification in step S58 and step S64, which will be described later, by the display 18 displaying a screen or the speaker 19 outputting a sound.

When determining in step S56 that the voltage E1 is greater than or equal to the threshold value Y (S56: YES), the interface ECU 11 determines whether it is able to communicate with the safe exit assist ECU 12 (S60). For example, the interface ECU 11 determines that it is unable to communicate with the safe exit assist ECU 12 when the communication with the safe exit assist ECU 12 cannot be continuously established a predetermined number of times or more. When determining that the communication with the safe exit assist ECU 12 is interrupted (S60: NO), the interface ECU 11 advances the process to the above-described step S58. When determining that the communication with the safe exit assist ECU 12 is not interrupted (S60: YES), the interface ECU 11 advances the process to step S62.

In step S62, the interface ECU 11 determines whether the safe exit assist ECU 12 has requested for display of information indicating that provision of the safe exit assist feature is to be stopped. In a case where the display of the information has been requested (S62: YES), the interface ECU 11 notifies the occupant of information indicating that the provision of the safe exit assist feature has been normally stopped (S64), and then ends the process of FIG. 3 in the current control cycle. In a case where the display of the information has not been requested (S62: NO), the interface ECU 11 ends the process of FIG. 3 in the current control cycle.

Operation and Advantages of Embodiment

The operation and advantages of the present embodiment will now be described.

In the vehicle 10 of the present embodiment, the safe exit assist ECU 12 provides a safe exit assist feature. To start providing the safe exit assist feature, the safe exit assist ECU 12 sets the ongoing execution flag F. The safe exit assist ECU 12 stops providing the safe exit assist feature when a condition for stopping the provision is satisfied. To stop providing the safe exit assist feature, the safe exit assist ECU 12 clears the ongoing execution flag F, and requests the interface ECU 11 to notify information indicating that the provision of the safe exit assist feature is to be stopped. In response to this request, the interface ECU 11 notifies the occupant of the information. This allows the occupant in the vehicle 10 to recognize that the provision of the safe exit assist feature is to be stopped. In this context, the stop of the provision of the safe exit assist feature in response to the satisfaction of the provision stop condition is referred to as a normal stop of the provision of the feature. The stop of the provision of the safe exit assist feature due to another factor, such as a failure, is referred to as an abnormal stop of the provision of the feature.

While the safe exit assist feature is being provided, the provision of the safe exit assist feature may be abnormally stopped due to a failure of a power supply system of the vehicle 10, a communication failure, or the like. The interface ECU 11 detects that the provision of the safe exit assist feature has been abnormally stopped, based on the power source state signal PS, the voltage E1 of the first power source line 24, and the state of communication the safe exit assist ECU 12. When detecting the provision of the safe exit assist feature has been abnormally stopped, the interface ECU 11 notifies the occupant of information indicating that the provision of the safe exit assist feature has been abnormally stopped. Thus, even when the provision of the safe exit assist feature has been abnormally stopped, the occupant in the vehicle 10 can recognize that the provision of the safe exit assist feature has been stopped.

The safe exit assist ECU 12 sets the ongoing execution flag F when starting providing the safe exit assist feature, and clears it when stopping providing the feature. In the vehicle 10 of the present embodiment, the state of the ongoing execution flag F is used as the first information, indicating whether the safe exit assist ECU 12 has stopped providing the safe exit assist feature. The power source management ECU 13 outputs the power source state signal PS, indicating whether the power source management ECU 13 has supplied power to the safe exit assist ECU 12 through the first power source line 24. In the vehicle 10 of the present embodiment, the power source state signal PS is used as the second information, indicating whether the power necessary for providing the safe exit assist feature has been supplied to the safe exit assist ECU 12. In the vehicle 10 of the present embodiment, the voltage E1 of the first power source line 24 is also used as the second information. In the vehicle 10 of the present embodiment, the safe exit assist ECU 12 corresponds to a control unit that provides the safe exit assist feature to assist the occupant in exiting the vehicle 10. Further, in the vehicle 10 of the present embodiment, the interface ECU 11 (along with the display 18 and the speaker 19) corresponds to a notification unit that notifies the occupant of information indicating that the safe exit assist feature has not been provided, based on the first information and the second information. Alternatively, the display 18 and the speaker 19 correspond to a notification device, and the interface ECU 11 corresponds to a notification control unit that causes the notification device to issue a notification.

The vehicle 10 of the present embodiment has the following advantages.

(1) The vehicle 10 of the present embodiment includes the interface ECU 11, which provides the interface feature between the vehicle 10 and the occupant, and the safe exit assist ECU 12, which provides the safe exit assist feature. The interface ECU 11 in the vehicle 10 of the present embodiment acquires the first information and the second information. The first information indicates whether the safe exit assist ECU 12 has stopped providing the safe exit assist feature. The second information indicates whether the power necessary for providing the safe exit assist feature has been supplied to the safe exit assist ECU 12. The interface ECU 11 notifies the occupant of information indicating that the safe exit assist feature has not been provided when at least the following requirements 1 and 2 are satisfied. Requirement 1 is that the first information indicates that the safe exit assist ECU 12 has not stopped providing the safe exit assist feature. Requirement 2 is that the second information indicates that the power necessary for providing the safe exit assist feature has not been supplied to the safe exit assist ECU 12. Thus, even when the provision of the safe exit assist feature has been abnormally stopped because the proper supply of power to the safe exit assist ECU 12 has been stopped due to a failure of a power supply system or the like, the interface ECU 11 can notify the occupant that the provision of the feature has been stopped. Accordingly, the vehicle 10 of the present embodiment has an advantage of enabling the occupant to recognize that the provision of the safe exit assist feature has been stopped due to an unexpected power supply interruption.

(2) Based on the first information, the interface ECU 11 in the vehicle 10 of the present embodiment notifies the occupant of information indicating that the provision of the safe exit assist feature has been stopped when it is confirmed that the safe exit assist ECU 12 is to normally stop providing the safe exit assist feature. In a case in which the condition for stopping the provision of the safe exit assist feature (e.g., the condition that the provision of the safe exit assist feature is to be stopped after all the occupants exit the vehicle 10) has been set, there is no need to notify the occupant that the provision of the feature is to be stopped. When the provision of the safe exit assist feature is to be stopped also under other conditions, there is a possibility that the provision of the safe exit assist feature is to be stopped before the occupants exit the vehicle 10. Thus, the interface ECU 11 issues a notification to the occupants even when the provision of the safe exit assist feature has been normally stopped. As a result, the occupants are prevented from exiting the vehicle 10 without recognizing that the provision of the safe exit assist feature has been stopped.

(3) Based on the following two types of information, the interface ECU 11 in the vehicle 10 of the present embodiment determines whether the power required for providing the safe exit assist feature has been supplied to the safe exit assist ECU 12. One is the power source state signal PS output from the power source management ECU 13, which manages the supply of power to the safe exit assist ECU 12. The other one is the voltage E1 of the first power source line 24, which is detected by the interface ECU 11. That is, the interface ECU 11 acquires the second information, indicating whether the power necessary for providing the safe exit assist feature has been supplied to the safe exit assist ECU 12, from the power source management ECU 13, and also acquires the second information by directly detecting the second information. This allows for accurate determination regarding whether the power necessary for providing the safe exit assist feature has been supplied to the safe exit assist ECU 12.

(4) The interface ECU 11 notifies the occupant of information indicating that the safe exit assist feature has not been provided even when the first information indicates that the safe exit assist ECU 12 has not stopped providing the safe exit assist feature and the interface ECU 11 is unable to communicate with the safe exit assist ECU 12. Thus, even when the provision of the safe exit assist feature has been abnormally stopped due to communication system failures or communication disruptions, the occupant is notified that the feature has been abnormally stopped.

Modifications

The present embodiment may be modified as follows. The present embodiment and the following modifications can be combined as long as they remain technically consistent with each other.

The condition for stopping providing the safe exit assist feature may be changed.

The method for determining whether communication with the safe exit assist ECU 12 is possible in S60 of FIG. 3 may be changed.

In the process of FIG. 3, when it is determined that the ongoing execution flag F has been set (S52: YES), the determination of step S60 may be omitted. That is, the occupant may not be notified that the ongoing execution flag F has been set and the communication with the safe exit assist ECU 12 cannot be performed. When it is determined that the ongoing execution flag F has been set, the determination process of step S62 may also be omitted.

Only one of the power source state signal PS and the voltage E1 of the first power source line 24 may be used as the second information, indicating whether the power required for providing the safe exit assist feature has been supplied to the safe exit assist ECU 12. The second information may be information other than the power source state signal PS and the voltage E1 of the first power source line 24.

The safe exit assist ECU 12 may periodically reset the ongoing execution flag F while providing the safe exit assist feature.

When stopping the provision of the safe exit assist feature, the safe exit assist ECU 12 may directly notify the interface ECU 11 that the provision of the feature is to be stopped, so that the interface ECU 11 may check whether the safe exit assist ECU 12 has stopped providing the safe exit assist feature. In this case, the notification of stopping provision from the safe exit assist ECU 12 corresponds to the first information.

When the provision of the safe exit assist feature is normally stopped, the occupant does not have to be notified. For example, the condition for stopping provision of the safe exit assist feature may be that the vehicle 10 has been locked or it is confirmed that all the occupants have exited the vehicle 10. In this case, when the provision of the safe exit assist feature is normally stopped, it is considered that the occupant is not present in the vehicle 10, and thus the occupant does not have to be notified at the normal stop. Even when the condition for stopping the provision of the safe exit assist feature is obvious to the occupant and the occupant can recognize that the provision of the feature has been stopped, the occupant does not have to be notified at the normal stop.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle comprising:

a control unit configured to provide a safe exit assist feature that supports an occupant in exiting the vehicle; and a notification unit including at least one of a display and a speaker, wherein the control unit is configured to perform, as the safe exit assist feature, warning to the occupant or restricting of door opening in a case where there is an object that may come into contact with the door when a door opening operation is performed, power is supplied to the control unit through a first power source line, power is supplied to the notification unit through a second power source line different from the first power source line, and the notification unit is configured to:

acquire first information indicating whether provision of the safe exit assist feature has been normally stopped by the control unit, and second information indicating whether power supplied to the control unit through the first power source line is equal to or greater than a threshold value corresponding to power required for providing the safe exit assist feature; and when the first information indicates that the provision of the safe exit assist feature has not been normally stopped by the control unit and the second information indicates that the power supplied to the control unit through the first power source line is less than the threshold value corresponding to the power required for providing the safe exit assist feature, notify the occupant of information indicating that the safe exit assist feature has not been provided through at least one of image output from the display and sound output from the speaker.

2. The vehicle according to claim 1, further comprising a power source management unit configured to manage supply of power to the control unit, wherein the notification unit is configured to acquire the second information from the power source management unit.

3. The vehicle according to claim 1, wherein the notification unit is configured to acquire the second information by detecting power that has been supplied to the control unit.

4. The vehicle according to claim 1, wherein the notification unit is configured to notify the occupant of the information indicating that the safe exit assist feature has not been provided through the at least one of the image output from the display and the sound output from the speaker even when the first information indicates that the provision of the safe exit assist feature has not been normally stopped by the control unit and the notification unit is unable to communicate with the control unit.

5. The vehicle according to claim 1, further comprising a sensor for detecting the object; and an opening limiting device connected to the control unit, wherein the control unit is configured to restrict the door opening using the opening limiting device in response to the sensor detecting the object that may come into contact with the door when the door opening operation is performed.

* * * * *